United States Patent [19]

Dunfield

[11] Patent Number: 5,675,230
[45] Date of Patent: Oct. 7, 1997

[54] METHOD AND APPARATUS FOR DYNAMIC LOW VOLTAGE SPINDLE MOTOR OPERATION

[75] Inventor: John C. G. Dunfield, Santa Cruz, Calif.

[73] Assignee: Seagate Technology, Inc., Scotts Valley, Calif.

[21] Appl. No.: 589,792

[22] Filed: Jan. 22, 1996

Related U.S. Application Data

[63] Continuation of Ser. No. 205,185, Mar. 1, 1994, abandoned.

[51] Int. Cl.$^6$ .................................................. H02P 1/26
[52] U.S. Cl. .................... 318/772; 318/771; 318/254; 318/138; 318/439
[58] Field of Search ............................ 318/771, 772, 318/778, 254, 138, 439

[56] References Cited

U.S. PATENT DOCUMENTS

| | | |
|---|---|---|
| 3,624,471 | 11/1971 | Japp et al. . |
| 4,371,903 | 2/1983 | Lewis . |
| 4,413,218 | 11/1983 | Taylor et al. . |
| 4,513,236 | 4/1985 | Kikukawa et al. ............ 318/685 |
| 4,609,859 | 9/1986 | Williams ........................ 318/254 |
| 4,634,948 | 1/1987 | Brigham ........................ 318/254 |
| 4,651,069 | 3/1987 | Pellegrini ...................... 318/254 |
| 4,679,102 | 7/1987 | Wevers et al. . |
| 4,742,410 | 5/1988 | Smith . |
| 4,751,595 | 6/1988 | Kishi et al. . |
| 4,786,995 | 11/1988 | Stupeck et al. . |
| 4,866,554 | 9/1989 | Stupeck et al. . |
| 4,870,332 | 9/1989 | Coghran et al. ............... 318/138 |
| 4,922,169 | 5/1990 | Freeman ....................... 318/254 |
| 4,933,785 | 6/1990 | Morehouse et al. . |
| 5,225,759 | 7/1993 | Endo et al. ................... 318/254 |

OTHER PUBLICATIONS

Western Digital Corporation, "An Optimization Method of Spindle Motor and Driver Selection Within a Disk Drive System", by Raffi Codilian and Don Stupeck.

Western Digital Corporation, "A Multi Mode Spindle Selection Within a Disk Drive System", by Raffi Codilian and Don Stupeck.

*Primary Examiner*—Karen Masih
*Attorney, Agent, or Firm*—Flehr Hohbach Test Albritton & Herbert LLP

[57] ABSTRACT

Dynamic operation of a brushless N-phase DC motor results in a high torque constant (Kt) line-to-line phase configuration during spindle motor power-up, and in a lower effective Kt configuration once normal run speed operation is attained. When the spindle motor is rotating below a predetermined run speed, drive transistors coupled to the motor phases cause at least two phases to be series-coupled between the source of operating voltage and ground. This ensures a large initial torque because the Kt contribution of each series-coupled phase is combined vectorially. Once run speed is achieved, effective Kt is lowered by causing the drive transistors to energize but a single phase, reconfiguring the spindle motor for line-to-neutral operation. So doing reduces the effective back electromagnetic force, permitting sufficient run current from a given magnitude operating voltage source. The present invention permits designing the spindle motor Kt for line-to-neutral normal run speed conditions, while ensuring a large start-up Kt by starting the motor line-to-line.

13 Claims, 8 Drawing Sheets

METHOD AND APPARATUS FOR DYNAMIC LOW VOLTAGE SPINDLE MOTOR OPERATION

This is a continuation of application Ser. No. 08/205,185 filed Mar. 1, 1994 now abandoned.

FIELD OF THE INVENTION

The invention relates to operating low voltage brushless DC motors in general, and more specifically to operation of a low voltage brushless DC spindle motor in a magnetic disc drive storage unit.

BACKGROUND OF THE INVENTION

The preferred embodiment of the present invention operates a low voltage brushless DC spindle motor in a magnetic disc drive storage unit. For that reason, the background of this invention will be described with respect to operation of such motors. However, the present invention may be used to control brushless DC motors in non-computer applications as well.

As shown by FIG. 1, a typical magnetic disc storage system 2 includes one or more magnetic storage discs or platters 4, 6 that are rotated with run velocity ω by a spindle motor 8 electrically coupled to drive electronics 10. Discs 4, 6 each have upper and lower surfaces upon which data may be magnetically written or read. More specifically, projecting arms of an actuator carriage 12 carry read/write heads (hereafter "heads") 14, 16 that respectively read and/or write data from the surfaces of discs 4 and 6. Generally, a voice coil mechanism 18 causes actuator carriage 12 to move all heads radially under command of a positioning servo controller mechanism (not shown).

When the spindle motor is not running, disc drive units park the head-ends of the actuator carriage. Some disc drive units include stationary parking ramps (not shown), upon which the head-ends of the actuator carriage 12 rest when the spindle motor 8 is not running. It may in fact be advantageous to couple the so-called back electromagnetic force ("EMF") generated by the spindle motor 8 during power-down (e.g., when motor 8 is turning off) to the voice coil mechanism to assist positioning carriage 12 onto the ramps. Alternatively, many disc drive units provide a latching mechanism (not shown) that engage the head-end of the actuator carriage when the spindle motor is not operating. So-called inertia latches (not shown) may also be provided to engage the head-end of the actuator carriage in the event of mechanical shock. It will be appreciated that parking the heads away from the disc surfaces can help protect the disc media from damage from physical contact with the heads. In any event, at spindle motor power-up, the heads must be unparked.

Modern disc drive units must also be able to handle substantial mechanical shock, often several hundred "g" units, or higher. To enhance mechanical shock capacity, the actuator assembly 12 is mechanically preloaded, essentially to stiffen the assembly. In disc drive units without stationary parking ramps, more stiffening is generally required to protect the magnetic media on the disc platter surfaces against physical contact with the heads.

Brushless DC low voltage motors such as spindle motor 8 are well known in the art. Such motors have a number of windings (or "phases"), that are sequentially coupled to a direct current ("DC") power source. As current flows through selected windings, torque-inducing magnetic flux orientations are produced in a synchronized fashion. The resultant torque causes a desired rotational movement of the motor rotor and attached discs 4, 6.

FIG. 2 shows the internal motor windings A, B and C for a typical three-phase brushless DC spindle motor 8. Each winding has an inductance Lx effectively in series with an associated resistance Rx and an effective back EMF generator Ex, where x=a, b or c. Further, effective mutual inductances, shown as m ab, m bc, m ac, are also present between the windings. Collectively, for each winding A, B or C, the associated inductance, series resistance, and mutual inductance may be defined by an effective impedance Zx in series with an associated back EMF generator Ex.

Drive electronics 10 typically provides two output drive transistors per each winding, six transistors Q1–Q6 in total. The drive transistors need not be bipolar (as shown), and could in fact be field effect devices, or any other switching device. Low level drive circuitry (not shown) within electronics 10 generates sequential base drive signals that are coupled to the base leads of drive transistors Q1–Q6. These base drive signals sequentially pulse selected drive transistors to produce the desired motor rotation.

In the prior art, motor 8 is operated by simultaneously energizing two series-coupled phases, a so-called "line-to-line" or "bipolar" mode of operation. In this sense, "bipolar" means that current through a winding may be caused to flow in either direction, as contrasted to a "unipolar" configuration wherein winding current can only flow in one direction. To achieve line-to-line mode, output drive transistors Q1–Q6 are sequentially switched to maintain two motor windings coupled in series between the power supply Vcc and ground. For example, by simultaneously providing positive base signals to Q1 and Q6, these two drive transistors turn on, energizing windings A and B, all other drive transistors being off. After flux produced by energized windings A and B causes the rotor of motor 8 to rotate 60° (electrical degrees), the low level drive circuitry turns off Q1 and turns on Q2, whereupon windings B and C are energized. After 60° further electrical rotation, Q6 is turned off and Q1 turned on to energize windings C and A, and so forth.

Line-to-line operation has the advantage of generating a large torque when the spindle motor is turned on ("power-up"). A large initial torque is required to overcome frictional and other forces to ensure start-up rotation of the spindle motor rotor and attached discs 4 and 6.

The following two equations must be taken into account when operating a spindle motor:

$$T_x = Kt_x \cdot I_x \quad (1)$$

$$I_x = (Vcc - EMF_x)/Z_x \quad (2)$$

where for each winding number x, $T_x$=net torque, e.g., torque less detent torque $T_D$ (ounce-inch), $Kt_x$=spindle motor torque constant (ounce-inch/ampere), $I_x$=winding current (amperes), Vcc=power supply voltage (volts), $EMF_x$=back EMF (volts), and $Z_x$=equivalent winding impedance (ohms).

Detent torque $T_D$ is the torque that exists in the spindle motor when none of the windings are energized. This torque results from magnetically-related motor torque due to mechanical misalignment and the like, as well as from coulomb friction torque, and magnetic loss torque.

In applying equations (1) and (2), it is understood that the torque, Kt, and back EMF contribution of each energized series-coupled winding a vector component to the resultant produced torque, Kt, and back EMF. For example, in a three-phase motor, the vector resultant produced by two-series coupled windings, each having a unit torque constant Kt, will be Kt·√3 or 1.73·Kt, assuming sinusoidal back EMF waveforms.

When the spindle motor is off, back EMF is of course zero. However, at power-up, back EMF increases with increasing rotor rotational velocity ω. Thus, at power-up, little back EMF exists, to retard current I. As a result, for a given Vcc (e.g., 5 VDC, or 3.3 VDC or even 3.0 VDC), a large start-up current I can be provided.

From equation (1), it is apparent that by series-coupling two (or even more) windings that each have a reasonably large Kt, the resultant vectorially-combined Kt will be larger that the Kt for a single winding. As noted, the vector sum produced by series-coupling two windings in a three-phase (e.g., 120° offset) motor is 1.73·Kt. Thus, the resultant combination Kt×I product will be large, and the generated start-up torque T can be sufficiently large to ensure that the spindle motor will indeed rotate at power-up.

As noted, a large Kt is advantageous for spindle motor power-up. But, unfortunately, too large a Kt can become a liability once the desired rotational run velocity ω is attained because of the excessively large back EMF produced by the combined windings. As run velocity is approached and then attained, each series-coupled winding contributes an increasingly substantial back EMF component.

Since the available run current is directly proportional to (Vcc—back EMF), too a large back EMF (resulting from too large a Kt) can substantially reduce the magnitude of the available run current. Stated differently, as back EMF increases with rotational velocity, drive electronics 10 may no longer be able to cause sufficient current flow through the energized windings to sustain spindle motor rotation. Ideally, Kt should be sufficiently large to maintain a reasonable run current.

For a given Kt motor, Vcc may have to be increased to ensure a sufficient magnitude of run current through the series-coupled windings. However, increasing Vcc may not be a viable option as disc drive system power consumption will be increased substantially. Further, it may not be possible to increase Vcc. Many modern hard disc drive systems are expected to operate reliably and efficiently from a fixed low voltage battery-operated power supply, wherein Vcc may be as small as 3.0 VDC. Clearly, ensuring efficient normal run speed operation of a high Kt spindle motor from a low voltage power source may not always be feasible.

In summation, there is a need for a mechanism whereby a spindle motor can be operated to provide high torque at power-up, and yet not generate excessive back EMF under normal running velocity conditions.

The present invention discloses such a mechanism.

SUMMARY OF THE INVENTION

The present invention configures and operates a brushless DC spindle motor dynamically in one of two modes. During start-up, the disc drive electronics configures and operates the motor in a line-to-line mode. In this mode, two (or more) motor windings are series-coupled and energized. Because the torque constant Kt contributed by each energized series-coupled winding is vectorially summed, the resultant Kt is larger than that associated with a single winding. Because torque is proportional to Kt, the resultant large Kt causes a large start-up torque to be generated, thus guaranteeing start-up of the spindle motor. Although series-coupling windings will also increase the effective back electromagnetic force ("EMF"), this is not especially troublesome at start-up, whereas back EMF is zero.

An operating condition circuit senses when the motor has substantial attained the desired running velocity ω. When this condition is sensed, the disc drive electronics are dynamically reconfigured to now operate the spindle motor in a line-to-neutral mode. In this second mode, preferably only one motor winding is energized at a time. Because only a single winding is energized at a time, the effective back EMF generated in this line-to-neutral mode is less than what was generated in the first mode. Since the available running current through the energized winding is proportional to (Vcc—back EMF, where Vcc is the operating voltage), the reduced back EMF increases the available running current. This permits a spindle motor to operate more reliably from a smaller Vcc than if the motor were still operated in line-to-line. Alternatively, more than one line-to-neutral winding may be energized, with the windings parallel-coupled to reduce effective source impedance, thereby enhancing effective run current magnitude.

In practice, the spindle motor may be designed around a line-to-neutral Kt, based upon minimum available Vcc and run current considerations. By combining phases during start-up, the resultant effective Kt will be sufficiently large to ensure start-up.

Other features and advantages of the invention will appear from the following description in which the preferred embodiments have been set forth in detail in conjunction with the accompanying drawings.

DETAILED DESCRIPTION OF THE PREFERRED EMBODIMENTS

Figure 3:
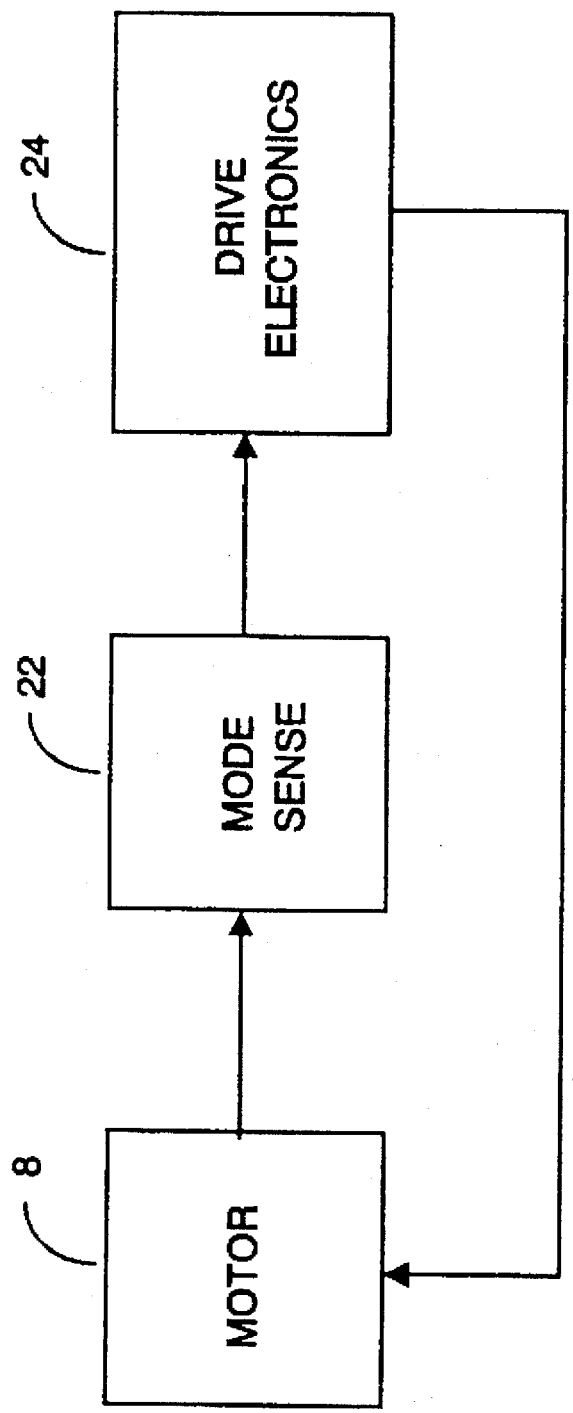
FIG. 3 is a block diagram of the present invention.

FIG. 3 is a generalized block diagram of the present invention, wherein motor 8 is an N-phase brushless DC motor that has N phases or windings, each of which has first and second ends. Drive electronics 24 is coupled to the various windings in motor 8. Electronics 24 selectively applies operating voltage Vcc from an external power source (not shown) to energize various of the windings. Typically drive electronics 24 is implemented on an integrated circuit chip that is mounted external to the spindle motor housing.

A mode sense circuit 22 is coupled between the motor and the drive electronics. Circuit 22 determines whether the present rotational velocity ω of motor 8 is less than or at least equal to a predetermined nominal running velocity $\omega_r$.

When $\omega<\omega_r$, mode sense circuit 22 outputs a signal causing drive electronics 24 to operate motor 8 in a line-to-line or bi-polar configuration. However, if $\omega\geq\omega_r$, the output signal from circuit 22 causes drive electronics to operate motor 8 in a line-to-neutral or unipolar configuration.

As noted earlier, this dynamic bi-modal operation permits motor 8 to generate a high starting torque when required (e.g., $\omega<\omega_r$), but to operate generating less effective back EMF during normal run mode (e.g., $\omega\geq\omega_r$).

For an N-phase motor, line-to-line mode operation can be achieved by having drive electronics 24 selectively energize two (or more) of the phases. This mode advantageously generates a high starting torque. But in line-to-neutral mode operation, drive electronics 24 causes only one phase to be energized at a time. This mode advantageously minimizes the effective back EMF contribution, and maximizes the available run current.

In each embodiment of drive electronics 24, the first end of each of the various windings is coupled to a drive transistor. However, in some embodiments, the second ends of the various windings are coupled together to form a common node, whereas in another embodiment, the second ends are not coupled together, but instead are coupled to drive transistors in an "H"-bridge configuration.

Figure 4A:
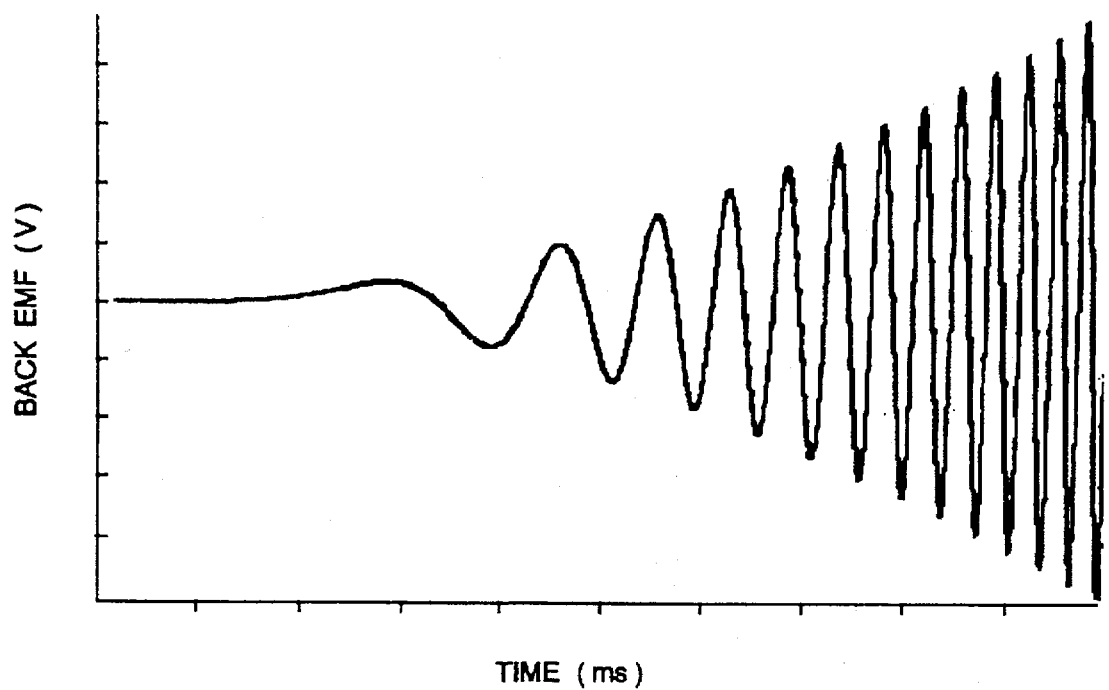
FIG. 4A depicts generated back EMF as a function of time for a single phase of a spindle motor.
Figure 4B:
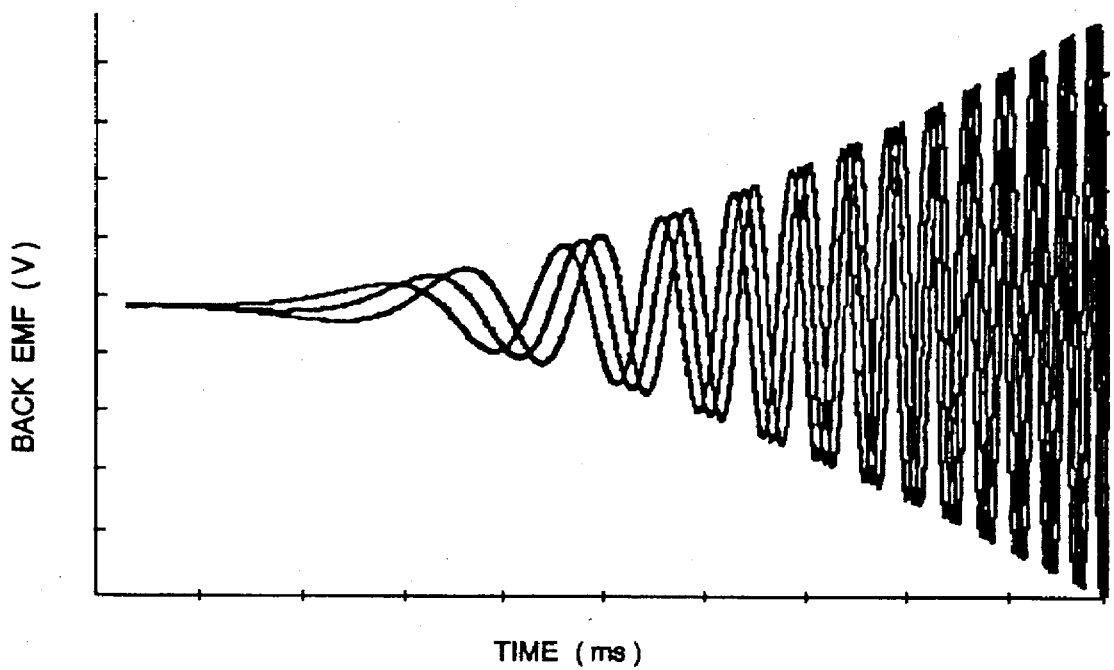
FIG. 4B depicts generated back EMF as a function of time for each phase of a three-phase spindle motor.

The operation of mode sense circuitry 22 will now be briefly described. As shown in FIGS. 4A and 4B, as the spindle motor powers-up, the generated back EMF begins at zero and increases in both peak-to-peak amplitude and in frequency as a function of time. Depending upon the spindle motor, the back EMF may increase to a few volts peak-to-peak within a second or two after start. Thus, mode sense circuitry 22 can sense back EMF magnitude (e.g., by peak-to-peak measurements) and/or sense frequency (e.g., by sensing zero crossings) to obtain a measure of $\omega$. A voltage or current proportional to the measured $\omega$ can then be compared to a predetermined reference voltage or current that is representative of the nominal $\omega_r$. If $\omega<\omega_r$, mode sense circuit 22 will output a signal to drive electronics 24 causing line-to-line configuration and operation of motor 8. On the other hand, when $\omega\geq\omega_r$, mode sense circuitry 22 will output a signal causing drive electronics 24 to configure and operate motor 8 in a line-to-neutral configuration.

Figure 5:
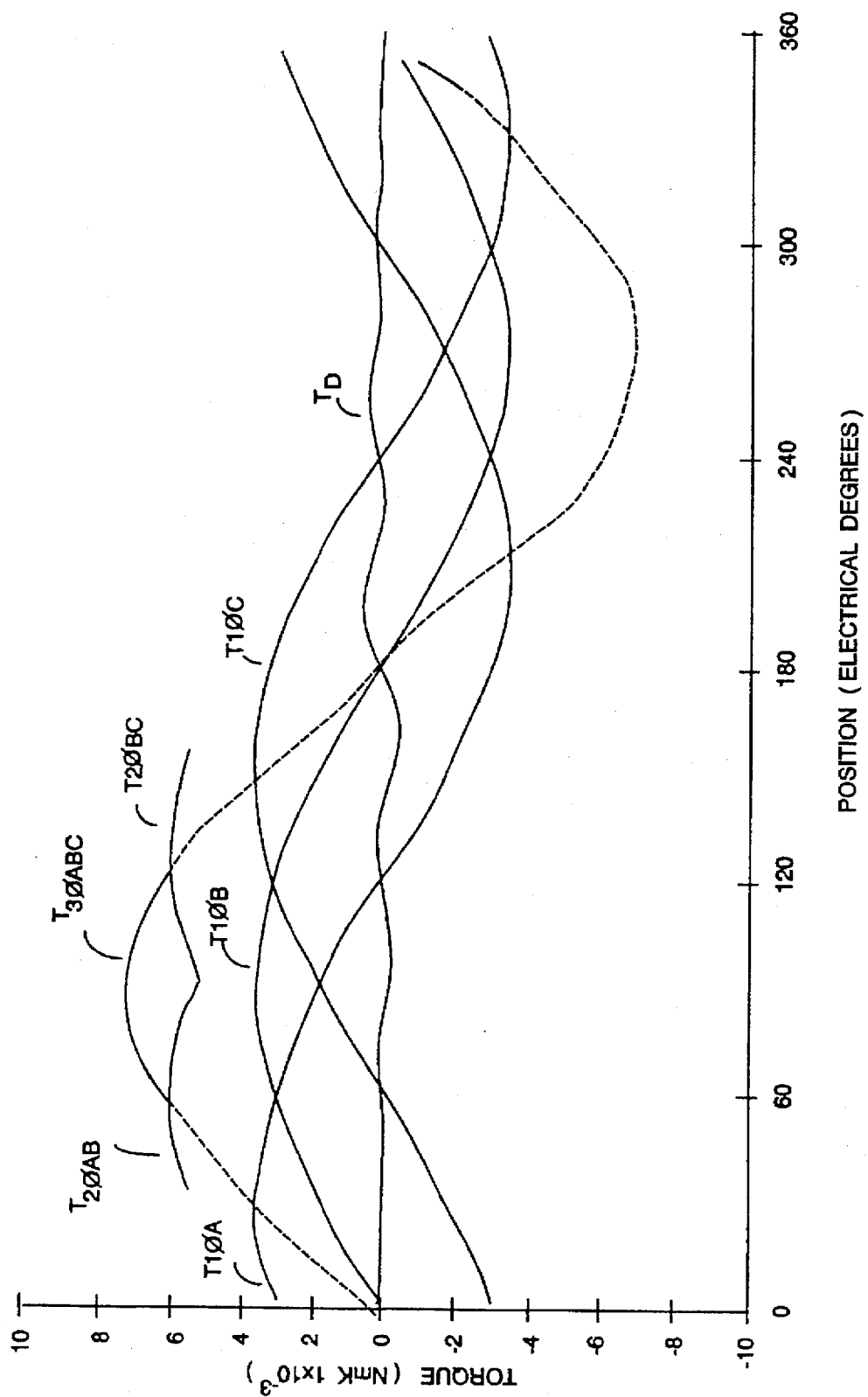
FIG. 5 depicts torque components produced from energizing single phases, two phases, and three phases, as well as detent torque.

FIG. 5 depicts torque for a three-phase spindle motor as a function of rotor position, as measured in electrical degrees. Shown spaced-apart 120° are relatively low magnitude torques for the individual phases, denoted T1$\phi$A, T1$\phi$B, and T1$\phi$C. If two phases are series-coupled, the vector-summed resultant torque will be approximately $\sqrt{3}$ or 1.73 times higher than for a single phase. This is shown by the waveforms denoted T2$\phi$AB and T2$\phi$BC, which represent line-to-line energizing of phases A and B, and then phases B and C. If all three phases are series-coupled, the resultant torque, denoted T3$\phi$ABC is even higher, as shown.

It will be appreciated that a variety of circuits and components comprising drive electronics 24 may be used to dynamically configure motor 8, according to the present invention.

Figure 6:
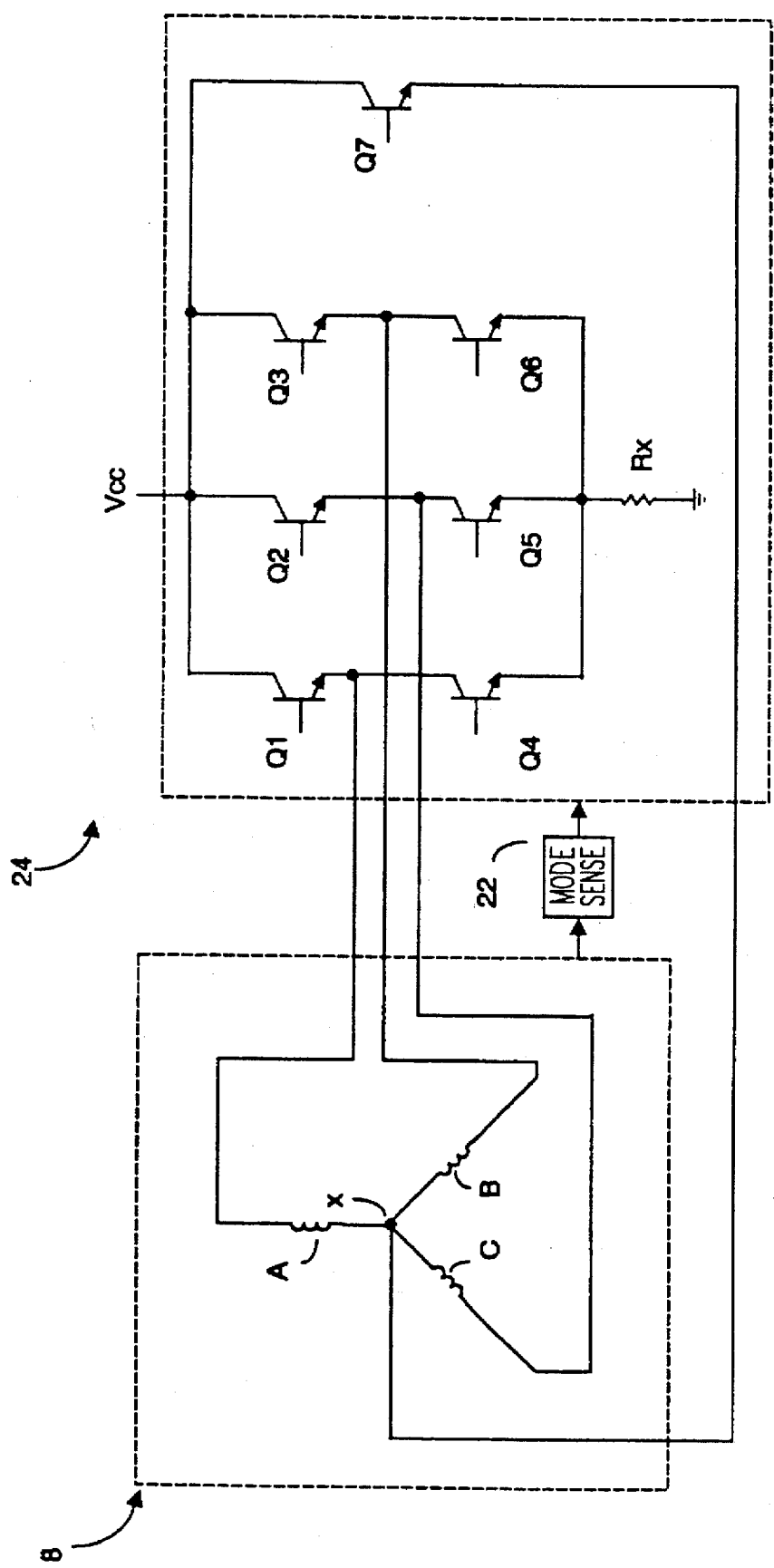
FIG. 6 depicts a seven-transistor drive electronics circuit for bi-mode operation of a three-phase spindle motor, according to the present invention.

FIG. 6 depicts a first embodiment of the present invention. Drive transistors Q1–Q6 are coupled to respect phase ends of windings A, B and C, wherein the other phase ends are coupled together to form a common node labelled "x". Node x is coupleable to the Vcc power source via mode switch Transistor Q7.

When Q7 is off, drive transistors Q1–Q7 can operate motor 8 in line-to-line mode, as in the prior art. It is understood that drive circuitry 24 includes low level circuitry coupled to the base leads of transistors Q1–Q7. The low level circuitry is also coupled to mode sense circuit 22, and outputs proper base drive signals to Q1–Q7. The best utilization of a motor is to employ as much of the motor at a time as possible, e.g., to employ all three phases in a three phase motor. If desired, more than two phases may be simultaneously operated in the line-to-line mode by generating appropriate base drive signals for Q1–Q7.

Once normal run speed has been ascertained (as confirmed by sense circuit 22), motor 8 is reconfigured to operate line-to-neutral. With reference to FIG. 6, the low level circuitry associated with circuit 24 now biases Q1, Q2 and Q3 off, and biases Q7 on, thus bringing node x close to Vcc potential. By sequentially turning on Q4, Q5, Q6, line-to-neutral or unipolar operation of motor 8 results, with only one line energized at a time. As noted, this advantageously reduces the magnitude of retarding back EMF, and thus permits a given magnitude Vcc to reliably sustain the motor rotation. It will be appreciated, however, that in line-to-neutral mode, the current density associated with drive transistors Q4, Q5 and Q6 will be relatively high, as these transistors will carry the motor current.

Figure 7:
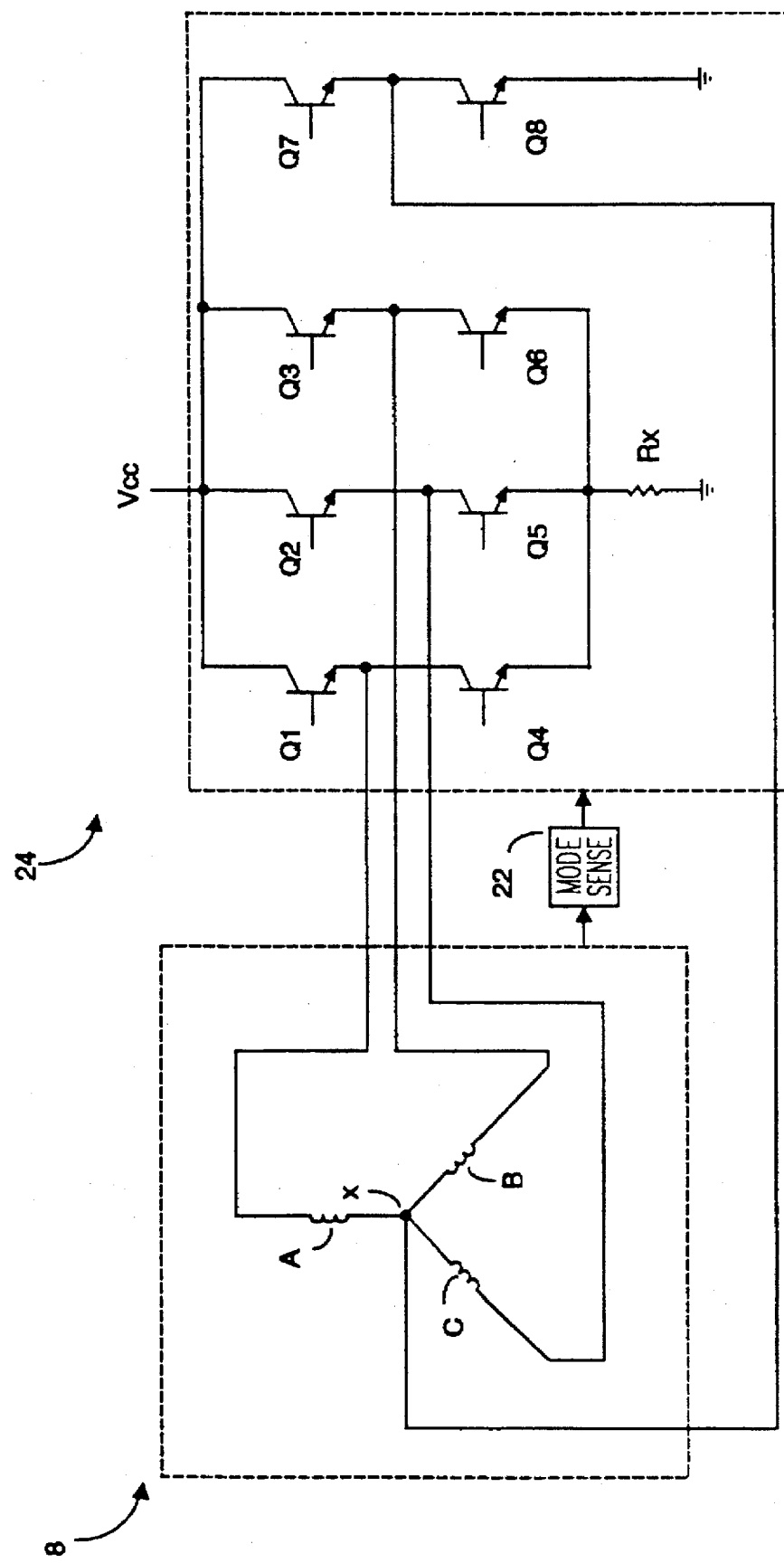
FIG. 7 depicts an eight-transistor drive electronics circuit for bi-mode operation of a three-phase spindle motor, according to the present invention.

FIG. 7 depicts yet another configuration for drive electronics 24, suitable for dynamically reconfiguring operation of motor 8. For start-up, motor 8 is operated line-to-line, and Q1–Q6 are switched in the normal fashion by low level circuitry associated with electronics 24, with additional transistors Q7 and Q8 biased off. However, when mode sense circuit 22 determines that normal run speed is present, drive electronics 24 now operates Q7–Q8 in the following manner: Q1–Q8 on to energize A, then Q6–Q7 on to energize B, then Q2–Q8 to energize C, then Q4–Q7 on to energize A, then Q3–Q8 on to energize B, then Q5–Q7 on to energize C, and so forth.

Using the configuration of FIG. 7, the advantages of line-to-line start, and line-to-neutral run are attained. Further, ripple associated with torque will be less, contrasted to the embodiment of FIG. 6, in that current may be switched twice as frequently, although 50% more power loss is encountered in single phase operation.

Figure 1:
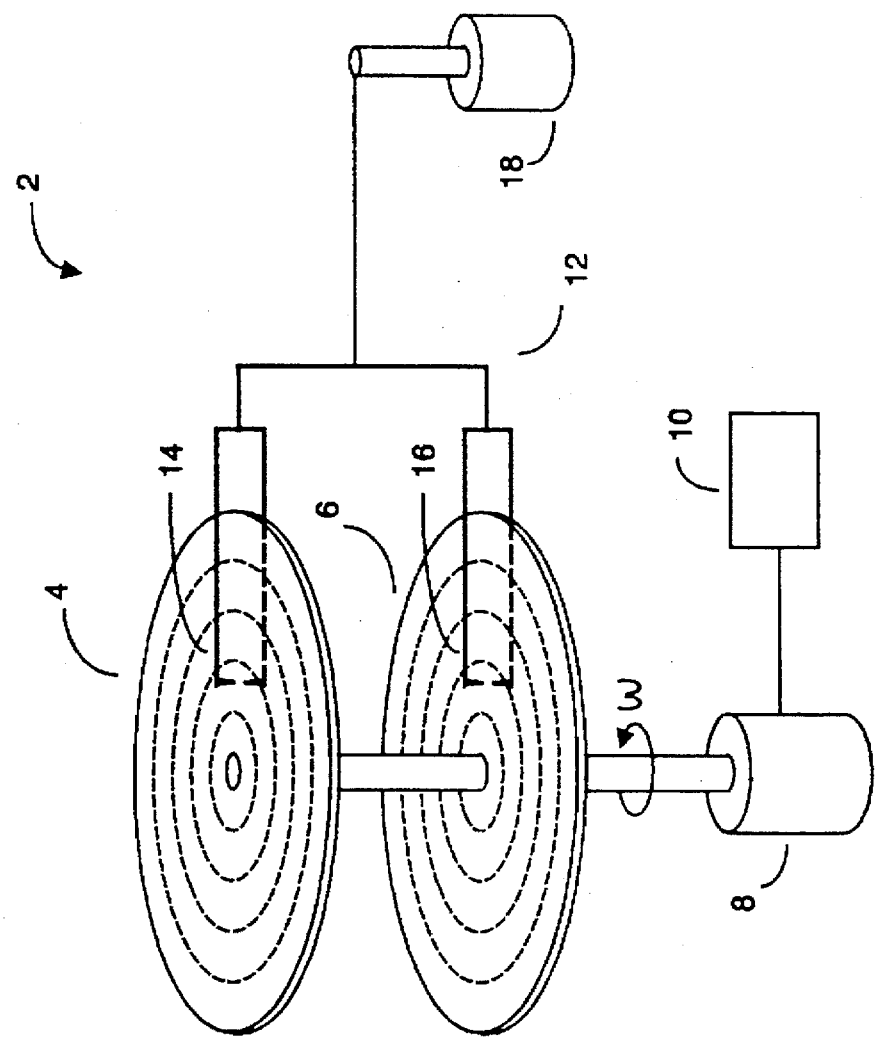
FIG. 1 depicts a generalized computer hard disc system, according to the prior art.
Figure 2:
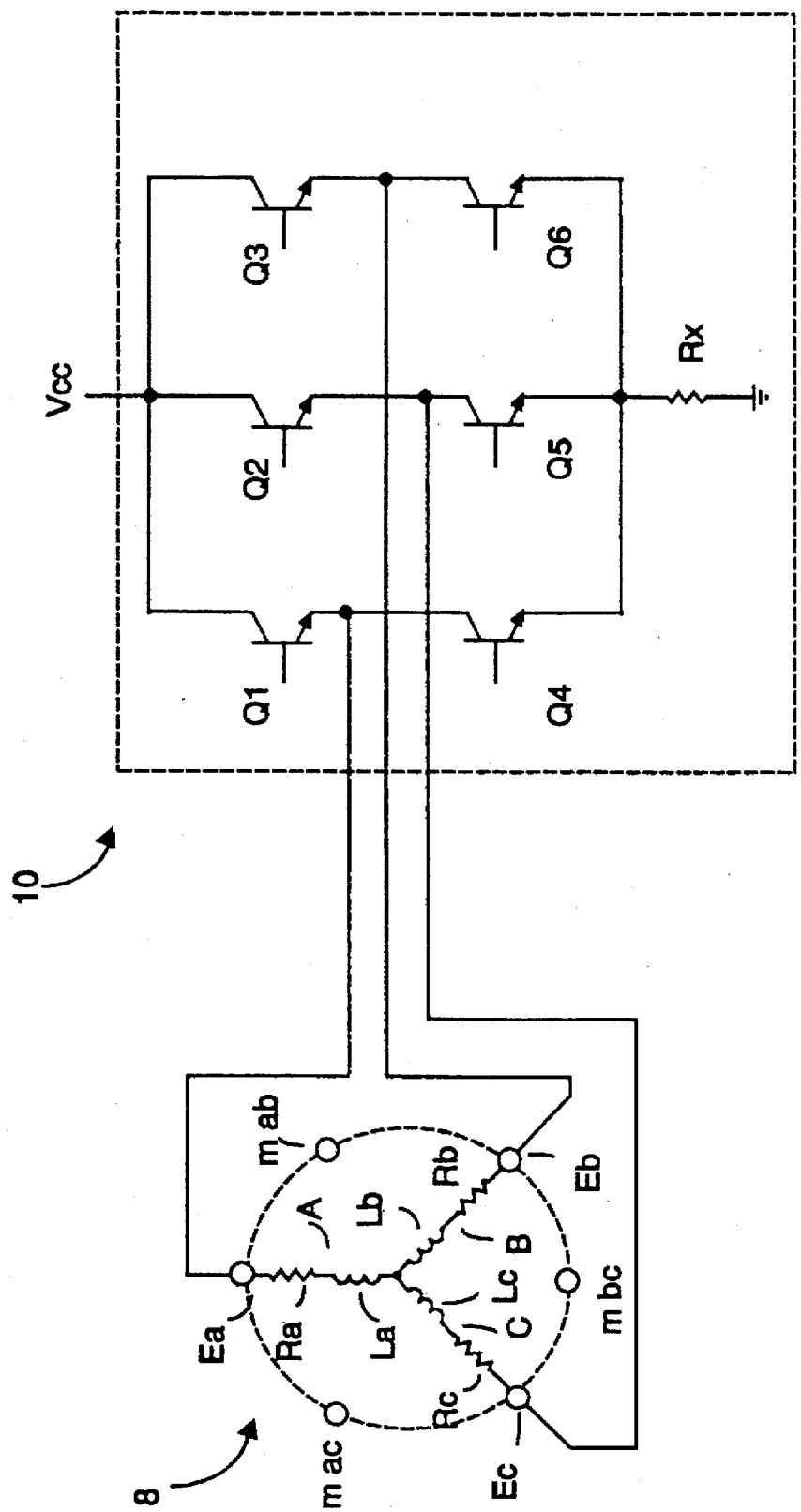
FIG. 2 depicts line-to-line operation of a three-phase brushless DC spindle motor, according to the prior art.

As described in a companion co-pending U.S. patent application filed herewith on Feb. 28, 1994 by applicant John C. G. Dunfield entitled "Method and Apparatus For Transferring Power From a Spindle Motor to a Voice Coil" and assigned to the common assignee Seagate Corporation, the configuration of FIG. 7 may be used to assist the voice coil mechanism 18 (see FIG. 1). As described more fully therein, when powering-down motor 8, at it is necessary to park the head-end of actuator 12 on a ramp, or otherwise remove the head-end from the surfaces of discs 4 and 6. The circuit of FIG. 7 can assist by transferring energy from the spindle motor 8 to the voice coil mechanism 18 at this time. More specifically, at power-down, e.g., in response to an on-off switch controlling Vcc, drive electronics 24 can advantageously cause motor 8 to revert from line-to-neutral mode back to a line-to-line mode. The line-to-line back EMF generated in that mode will be 1.73 times larger than in line-to-neutral mode, which extra voltage can be energy-coupled to the voice coil mechanism to provide additional current to help park the heads 14, 16. Applicant refers to and incorporates herein by reference said co-pending U.S. patent application.

Figure 8:
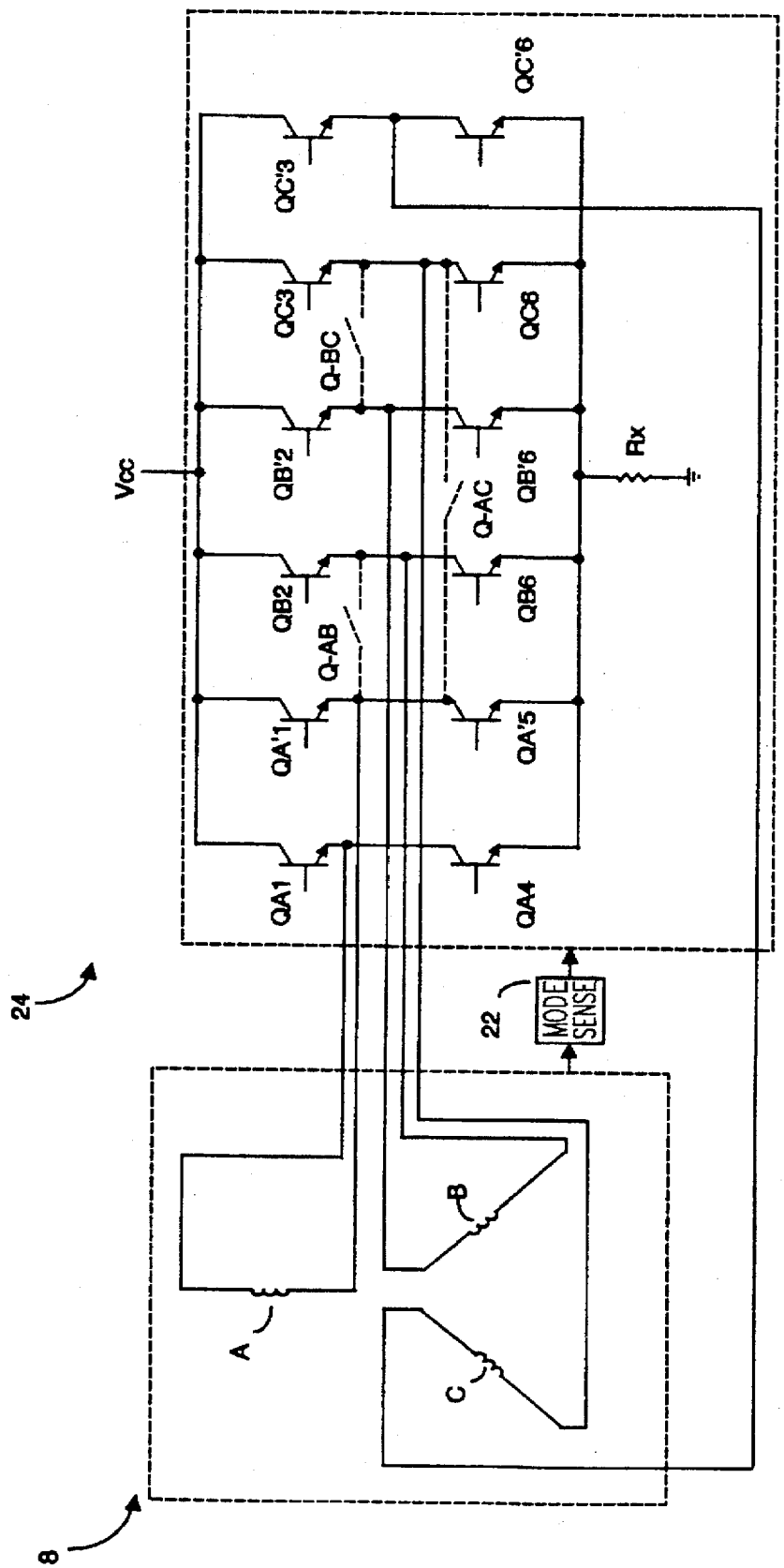
FIG. 8 depicts a twelve-transistor 3-"H" drive electronics circuit for multi-mode operation of a three-phase spindle motor, according to the present invention.

FIG. 8 shows yet another embodiment of the present invention, wherein six leads must be brought out from motor 8 for coupling to a drive electronics 24 that provides an "H"-bridge per winding. By "H"-bridge it is meant that each winding A, B, C is coupled as the horizontal element of an "H"-shaped bridge, whose vertical sides are a transistor pair. For example, transistors QA1 and QA4 form the left vertical side of an "H"-shaped bridge for winding A, for which transistors QA'1 and QA'4 form the right vertical side.

Also shown in FIG. 8 are optional bilateral switches, e.g., devices that can conduct current in either direction, coupled between the "H"-bridges. These switches, denoted Q-AB, Q-BC and Q-AC permit further dynamic configuration of the spindle motor to generate additional torque as needed.

Operation of the drive electronics 24 shown in FIG. 8 is preferably determined by mode sense circuit 22. For example, by turning off transistors QA'5, QB'6 and QC'6, line-to-line mode operation may be provided. However, if transistors QA'5, QB'6 and QC'6 are turned on, a common node such as node x in FIG. 7 is created, whereupon windings A, B and C may be operated line-to-neutral.

The "H"-bridge configuration of FIG. 8 permits using a higher percentage of the spindle motor (e.g., using more phases) to promote spindle motor efficiency. The torque curves shown in FIG. 5 demonstrate that by selectively energizing one, two or three phases simultaneously, generated torque can be varied as required.

The "H"-bridge configuration of FIG. 8 advantageously permits starting a spindle motor with one winding on (e.g., to consume maximum energy, for example in a battery operated system), with two windings on, or with three windings on.

Consider, for example, the use of the "H"-bridge configuration of FIG. 8 to start a spindle motor with two phases on, whereupon the motor operates about as if in a line-to-line configuration. For example, windings A and B may be so operated by turning on transistors QA1 and QA'5, and QB2 and QB'6. However, these windings may also be energized by turning on QA'1 and QA4, and by turning on QB'2 and QB6. This flexibility permits the energized windings to draw current from two portions of drive electronics 24, whose effective source impedance is approximately halved due to the parallel drive configuration that results. For a given Vcc, current through the energized windings may thus be increased, contrasted to a conventional line-to-line configuration.

Thus energizing two phases using the "H"-bridge configuration of FIG. 8, produces torques similar to those produced in a conventional line-to-line configuration, but more start current can be provided. It will be appreciated, for example, from Table I, that the start current can readily be ten times the run current for a spindle motor.

The drive electronics shown in FIG. 8 further allow flexibility in operating a spindle motor. For example, suppose upon power-up, motor 8 does not start, possibly due to increased rotor bearing friction due to ageing. The present invention permits starting the motor by energizing two windings, with resultant increased drive current and starting torque. If the motor starts (as sensed by sense electronics 22), then drive electronics 24 can be commanded to operate by energizing but a single winding at a time, commutating over 120° (electrical). This advantageously reduces current, an important consideration for battery operated hard disc drive units. Thus, while it may take longer to achieve full running velocity, if reduced power consumption is a more important consideration, the drive electronics shown in FIG. 8 can operate a spindle motor in the more efficient mode.

Further, should the spindle motor not start even with two windings on, the circuit of FIG. 8, by energizing various bilateral switches Q-AB, Q-BC, Q-AC can "jump start" the motor by energizing three phases, in an especially low drive impedance mode. If the motor is indeed viable, the resultant high torque achieved by combining three phases (see FIG. 5) will start the motor, whereupon the number of energized phases may be reduced from three to two, or even to one.

It will be appreciated that many configurations for drive electronics 24 may be implemented, using, without limitation, bipolar transistors and/or field effect transistors. Further, although the preferred embodiments have been described with respect to a three-phase motor, the present invention may be used to operate brushless DC motors having more than three phases. As a general proposition it may be desirable to start such motors by energizing as many series-coupled windings as possible (to ensure generation of a sufficiently large starting torque), preferably with a low source impedance (to maximize start current). After the motor is running, it is preferably reconfigured to operate in a mode wherein fewer windings (e.g., one) are energized (to ensure sufficient run current). However, as noted, it is also possible to run the motor with more than one phase energized at a time.

Table I shows some design considerations and design trade-offs that must be considered when designing a hard disc drive spindle motor system and drive electronics.

TABLE I

| DESIGN | 1 | 2 | 3 | 4 | 5 | 6 | 7 | 8 | 9 | 10 |
|---|---|---|---|---|---|---|---|---|---|---|
| Meat Spec'n | Yes | Yes | No | Yes | Yes | Yes | Yes | Yes | Yes | Yes |
| Rwind (Ω) | 2.14 | 2.14 | 2.14 | 2.14 | 2.72 | 2.75 | 3.49 | 3.49 | 3.49 | 1.83 |
| Driver | A | A | A | A | B | C | D | C | D | A |
| Device Count | 6 | 6 | 6 | 6 | 8 | 12 | 12 | 12 | 12 | 6 |
| Rdrvr (Ω) | 1.6 | 0.4 | 1.6 | 0.8 | 0.8 | 2.4 | 4.0 | 1.6 | 3.6 | 1.6 |
| Ts (oz.-in.) | 0.26 | 0.34 | 0.3 | 0.34 | 0.34 | 0.34 | 0.34 | 0.34 | 0.34 | 0.34 |
| Is (A) | 0.58 | 0.79 | 0.58 | 0.7 | 0.58 | 0.85 | 0.63 | 0.84 | 0.74 | 0.6 |
| Irun (mA) | 96 | 96 | 85 | 85 | 153 | 88 | 61 | 92 | 70 | 77 |

In Table I, columns 1–10 designate ten different designs for a spindle motor and associated drive electronics that were considered by applicant. The second row indicates whether each such design met an existing specification for a hard disc drive system spindle motor. For example, the first and third designs did not meet the desired specification. The third row states the resistance of the per phase windings, e.g., Ra, Rb, Rc. The row labelled "driver" indicates the configuration considered, wherein "A" denotes a line-to-line (bipolar) configuration, "B" denotes a line-to-line (bipolar) configuration at start-up and a line-to-neutral (unipolar) configuration during normal run, "C" denotes a 3-"H" bridge configuration operating with two phases on line-to-line (bipolar) with six motor leads, and "D" denotes 3-"H" bridges operating with three phases on line-to-line (bipolar)

with six motor leads being brought out. The "device count" row indicates how many drive transistors were required in the associated drive electronics, e.g., 6, 8 or 12, and the "Rdrvr" row gives the associated source impedance for these devices. The last three rows state the generated start torque, start current, and run current for each design.

Table I indicates that not all designs are created equal. For example, the "Rdriver" resistance values essentially dictate the integrated circuit chip area required to implement the output drive circuitry for drive electronics 24. Design 2, for example, met specification using only six drive transistors. However, the rather low 0.4 Ω drive impedance will require approximately four times the chip area to implement than will the driver for design 8, with its 1.6 Ω drive impedance. Even though design 8 uses twelve drive transistors compared to the six transistors used in design 2, design 8 can be implemented in a smaller chip area. Although drive transistor impedance is not the sole design criterion, it is nonetheless an important consideration. For example, while design 8 can be implemented using less chip area, six motor leads must be brought out of the spindle motor housing, whereas the drive electronics for design 2 require that only three leads be brought out (and that the common winding node be available).

Modifications and variations may be made to the disclosed embodiments without departing from the subject and spirit of the invention as defined by the following claims. For example, it will be appreciated that the present invention may be practiced with brushless DC motors in non-hard disc drive systems. Further, although bipolar transistor implementation of the drive electronics has been described, it will be understood that other switching. devices may be used instead, field effect transistors, for example.

What is claimed is:

1. A method for dynamic operation of a brushless N-phase DC motor, where N≥3, wherein a first end of each phase is coupled to a source of operating voltage or ground by an associated drive switch, and each second end of each said phase is coupled via a mode switch to said source of operating voltage, comprising the following steps:

(a) determining rotational speed of said motor by examination of back electromotive force generated by said motor;

(b) when said motor has a rotational speed less than a predetermined run velocity, configuring said motor in line-to-line mode by series-coupling at least two of said N-phases to a source of operating voltage;

(c) when said motor has a rotational speed at least equal to said predetermined run velocity, configuring said motor in line-to-neutral mode by coupling fewer than two of said N-phases to said source of operating voltage; and (d) configuring said motor between step (a) and step (b) by selectively changing the state of said mode switch and at least a chosen one of said drive switches.

2. The method of claim 1, wherein N=3, and wherein at step (a) the step of configuring said motor includes series-coupling two of said phases to said source of operating voltage, and wherein at step (b), the step of configuring said motor includes coupling one of said phases to said source of operating voltage.

3. The method as claimed in claim 1 wherein each said associated drive switch comprises a switchable drive transistor, and the step of configuring said motor comprising changing the state of said drive transistor.

4. The method as in claim 1 wherein said mode switch is a mode switch transistor, and the step of configuring said motor comprises changing the state of said mode switch transistor.

5. A system for dynamic operation of a brushless N-phase DC motor, where N≥3, one end of each said phase is coupled between a source of operating voltage and an associated drive switch comprising:

means for determining said rotational speed and for comparing said rotation speed to said predetermined run velocity; and electronic switch drive means, coupled to said motor and responsive to said means for determining rotational speed, for configuring said motor in line-to-line mode by series-coupling at least two of said N-phases to said source of operating voltage when rotational speed of said motor is less than a predetermined run velocity and for configuring said motor in line-to-neutral mode by series coupling fewer than two of said N-phases to said source of operating voltage when said rotational speed is at least equal to said predetermined run velocity, including means for configuring said motor between said line-to-line mode and said line-to-neutral mode is accomplished by selectively energizing at least a chosen one of said drive switches.

6. The system of claim 3, wherein N=3, and wherein said electronic switch drive means series-couples two of said phases to said source of operating voltage when said rotational speed is less than said predetermined run velocity and couples one of said phases to said source of operating voltage when said rotational speed is at least equal to said predetermined run velocity.

7. The system of claim 5, wherein said means for determining examines back electromagnetic force generated by said motor.

8. The system as claimed in claim 3 wherein said drive switch comprises a switchable drive transistor, and the step of configuring said motor comprises changing the state of said transistor.

9. The system as claimed in claim 8 wherein said mode switch is a mode switch transistor, and the step of configuring said motor comprises changing the state of said mode switch transistor.

10. The system of claim 3, wherein N=3, and wherein said electronic switch drive means series-couples two of said phases to said source of operating voltage when said rotational speed is less than said predetermined run velocity and couples one of said phases to said source of operating voltage when said rotational speed is at least equal to said predetermined run velocity.

11. In a magnetic disc drive storage system including one or more magnetic storage discs rotate by a brushless N-phase DC motor, where N≥3, a method for dynamic operation of said motor wherein a first end of each phase is coupled to a source of operating voltage or ground by an associated drive switch, and each second end of each said phase is coupled via a mode switch to said source of operating voltage, comprising the following steps:

(a) determining rotational speed of said motor by examination of back electromotive force (back emf), and comparing said rotational speed to a predetermined run velocity;

(b) when said motor has a rotational speed less than a predetermined run velocity, configuring said motor in line-to-line mode by series-coupling at least two of said N-phases to a source of operating voltage; and (c) when said motor has a rotational speed at least equal to said predetermined run velocity, configuring said motor in line-to-neutral mode by coupling fewer than two of said N-phases to said source of operating voltage.

12. The method of claim 11, wherein N=3, and wherein step (a) comprises series-coupling two of said phases to said source of operating voltage, and wherein step (b), comprises coupling one of said phases to said source of operating voltage, and wherein the step of configuring said motor between step (a) and step (b) is executed by selectively changing the state of said mode switch and at least a chosen one of said drive switches.

13. A system for dynamic operation of a brushless N-phase DC motor where N≧3, comprising means for determining rotational speed of said motor during motor startup by examining back emf of said motor, and for comparing said rotational speed to a run velocity of said motor electronic switch drive means coupled to said motor for coupling at least two of said N-phases to a source of operating voltage in a line-to-line configuration when said motor has rotational speed less than a predetermined run velocity, and for configuring said motor to connect less than two phases to said source in a line-to-neutral mode when said motor has a rotational speed equal to a predetermined run velocity.

* * * * *